United States Patent
Condon et al.

(10) Patent No.: US 6,378,912 B1
(45) Date of Patent: Apr. 30, 2002

(54) APPARATUS AND METHOD FOR CONNECTING SHOWER HEADS AND TUB SPOUTS TO A STUB OUT

(75) Inventors: Duane R. Condon, Ramona, CA (US); Frank D. Julian; Joseph P. Ismert, both of Kansas City, MO (US)

(73) Assignee: Sioux Chief Manufacturing Co., Inc., Peculiar, MO (US)

( * ) Notice: Subject to any disclaimer, the term of this patent is extended or adjusted under 35 U.S.C. 154(b) by 0 days.

(21) Appl. No.: 09/359,494

(22) Filed: Jul. 23, 1999

(51) Int. Cl.[7] .............................. F16L 5/00; F16L 41/00; F16L 15/00
(52) U.S. Cl. ........................... 285/220; 285/46; 285/39; 285/331; 285/332; 285/340; 239/273; 239/282; 239/283; 239/548; 4/596; 4/597; 4/605; 4/615; 4/676; 4/678
(58) Field of Search .................... 285/332, 340, 285/46, 331, 39; 239/282, 283, 548, 273; 4/596, 615, 597, 605, 678, 676

(56) References Cited

U.S. PATENT DOCUMENTS

| | | | |
|---|---|---|---|
| 999,332 A | * | 8/1911 | Mueller |
| 1,039,315 A | * | 9/1912 | Mueller ........................ 285/46 |
| 1,502,154 A | * | 7/1924 | Mueller et al. |
| 1,724,161 A | * | 8/1929 | Wuesthoff |
| 1,725,987 A | * | 8/1929 | Kersten |
| 3,291,510 A | * | 12/1966 | Kody |
| 3,429,596 A | * | 2/1969 | Marshall |
| 3,591,205 A | * | 7/1971 | Hamburg ........................ 285/81 |
| 3,633,944 A | * | 1/1972 | Hamburg ........................ 285/81 |
| 3,924,882 A | * | 12/1975 | Ellis ............................ 285/175 |
| 4,062,574 A | * | 12/1977 | Scholin ........................ 285/340 |
| 4,146,254 A | * | 3/1979 | Turner et al. ................ 285/105 |
| 4,181,329 A | | 1/1980 | Helm |
| 4,390,159 A | | 6/1983 | Duncan |
| 4,479,667 A | * | 10/1984 | Major ........................... 285/39 |
| 4,781,400 A | * | 11/1988 | Cunningham ................. 285/39 |
| 4,911,406 A | | 3/1990 | Attwood |
| 5,487,572 A | * | 1/1996 | Combot-Courrau et al. ..... 285/308 |
| 5,788,160 A | * | 8/1998 | Woog ........................... 239/282 |
| RE36,630 E | * | 3/2000 | Davey .......................... 285/39 |

* cited by examiner

*Primary Examiner*—B. Dayoan
*Assistant Examiner*—Carlos Lugo
(74) *Attorney, Agent, or Firm*—Shughart Thomson & Kilroy P.C.

(57) ABSTRACT

A system and method for installing plumbing spouts, such as shower heads and tub spouts, includes providing a stub out which protrudes out of a wall at shower height. A specialized adapter is then slid onto the protruding stub out until the adapter abuts the wall. The adapter is internally threaded with an integral ferrule, and may also be equipped with a one-way gripper ring and an O-ring to sealingly secure the spout to the stub out. The stub out, if closed, is then cut off outside the adapter and a standard shower arm or nipple for a tub spout is threaded into the adapter. A threaded end of the shower arm or nipple engages the ferrule and compresses it against the stub out creating a seal therebetween. When installing a shower head, an escutcheon plate is adapted to be slid over the shower arm to engage peripheral fingers of the adapter to secure the escutcheon in place. A shower head is then threaded onto the shower arm to complete the installation. A thin walled nipple with male threads at each end is used to secure a tub spout to the stub out. A first end of the nipple is threaded into the adapter on the stub out and the tub spout is threaded onto the second end of the nipple.

25 Claims, 4 Drawing Sheets

APPARATUS AND METHOD FOR CONNECTING SHOWER HEADS AND TUB SPOUTS TO A STUB OUT

FIELD OF THE INVENTION

The present invention relates to a system and method for installing wall mounted spouts, such as shower heads and tub spouts, and, more particularly, to such a system in which a specialized adapter is slid over a protruding length of 1 inch (⅝" O.D.) "nominal" water supply tubing or stub out which extends out of a finished wall for connection of a tub or shower spout or the like thereto. The adapter includes an integral molded ferrule and a female threaded receiver sized to permit the adapter to be slid over the stub out with a slight friction fit between the ferrule and the stub out. The threaded receiver is also sized to receive a threaded nipple of a spout water supply tube, such as a brass shower arm, such that threading the nipple of the spout water supply tube into the female threaded receiver of the adapter urges or presses the ferrule against the stub out creating a compression seal thereagainst. The adapter permits easy installation of a tub or shower spout or the like to the water supply with all of the threaded connections being accessible outside of the wall. For a more positive seal, an optional O-ring, which seals against the stub out, and an integral one way gripper ring, which prevents the adapter from being blown off or pulled off of the stub out, can be added to the adapter.

BACKGROUND OF THE INVENTION

Shower installations have traditionally been accomplished by extending a vertical pipe or tube upward from a shower tap to shower height where it is connected to a drop ear 90 degree elbow fitting with ½ inch female N.P.T. ("National Pipe Thread") threads which faces toward the shower room ready to receive a male threaded shower arm in the final stage of construction, connecting the elbow to a shower head. The elbow is nailed or screwed securely to a plate positioned within a stud wall which will be closed off with the finished wall. A length of threaded test pipe is then threaded into the elbow. The material used for the test pipe is often the most inexpensive, such as uncoated, black steel pipe. Test pipes made of such material are commonly discarded after one use. Uncoated pipe can rust, which causes further problems, as detailed below. The test pipe is then capped and the system is pressure tested. After the plumbing system is pressure tested, a finish wall covering material, such as wallboard, is applied with a hole cut to accommodate the test pipe and the wall is finished with tile, paint, wall paper, etc. Once the pressure test is complete and the finished wall is in place, the test pipe is removed and a shower arm (i.e. commonly a 6" to 8" length of pipe threaded ½" N.P.T. at both ends and bent roughly 45 degrees in the middle) is installed by threading it into the 90 degree elbow which is now hidden inside of the finished wall. It is important that the joint between the shower arm and the supply line does not leak yet the joint cannot be readily tested without cutting into the wall. An escutcheon plate is slid over the shower arm to cover the hole through which the shower arm extends. A shower head can then be installed onto the shower arm.

Tub spout installations are typically accomplished using one of two standard methods. The first is similar to the above-mentioned traditional method for shower head installation where a drop of 90 degree elbow fitting is securely fastened behind the finished wall at the precise level for the tub spout connection. Black iron test nipples are stubbed out, then extracted and a precise length of a supply line with male threaded nipples on each end is installed blindly onto the elbow fitting enclosed in the finished wall. The tub spout is then threaded directly onto the open end of the supply line. In another, more recently developed tub spout installation method, copper or other rigid tubing (⅝" O.D.) is stubbed out of the wall and specially designed and compression type tub spouts, which are expensive, are slid over the tube and secured by means of an integral clamp or set screw built into the spout's housing.

The traditional shower installation method presents a number of potential problems. The drop-ear elbows are fairly expensive and, often, will be inadequately secured to the plate behind the wall. As the threaded test pipe must be extracted and a threaded shower arm be reinstalled into the elbow, the elbow undergoes several occurrences of significant leverage and torque. First, the threads of the test pipe often become seized or rusted after a water pressure test is performed, causing excessive stress on the mounting anchors of the elbow as the test pipe is unthreaded. Secondly, additional stress is applied to the anchors of the elbow as the shower arm is often over tightened in order to orient it in an exact downward direction on the finished or shower head end. It, therefore, becomes extremely important to secure the elbow as solidly as possible. Craftsmen often go to great length to assure the solid security of the elbow, using one or more wood or metal brackets and braces and screws and nails of significant quantity and size. If the elbow is improperly secured, a variety of problems can ensue, ranging from misalignment of the female threads relative to the hole in the wall, making the shower arm installation difficult or impossible, or kinking and possibly severing the supply pipe. Even when the 90 degree elbow is properly installed and properly located behind the hole, the test pipe may have been cross threaded or over tightened into the elbow, thus damaging the female threads of the elbow. The test pipe may then pass the pressure test, but, when it is removed and the shower arm installed into the damaged threads of the elbow, a slow leak can result. Since the elbow is totally hidden within the wall, the leak can continue for years without being detected, often causing rot and mildew to occur within the wall and/or in the wall bottom plate, with consequent odor and hidden damage. Also, as there may be rusty, residual water in the test pipe, it may spill onto finished tub/shower surfaces when the test pipe is extracted, permanently staining such surfaces and only remedied by total replacement, with the attendant labor and material expense and delays. Also, since the shower arm must be positioned at a predetermined orientation to accommodate the shower head, it must be threaded into the elbow until it reaches that orientation. This can result in under tightening or over tightening of the arm to achieve that orientation, which can also result in leaks. Finally, after a shower arm has been in place for a number of years, it may corrode behind the finished wall and leak or even break off, leaving a threaded portion in the elbow. Repair of any of these problems necessitates cutting into the finished wall either on the shower side or from behind the shower wall, with the attendant labor, expense and down time associated therewith.

It is clear, then, that a need exists for a more convenient, efficient and cost effective system and method of installing shower heads and tub spouts. Such a system and method should avoid the above listed problems of the prior art by eliminating threaded elbows within the shower wall so that the supply piping is stubbed through the wall once, never having to be removed through all stages of testing, wall surface installation and finishing and finished plumbing fixture and trim installation, so that repairs or finish trim changes can be effected outside the finished wall material.

SUMMARY OF THE INVENTION

The present invention is directed to a system and method for installing wall mounted spouts including shower heads and tub spouts. A length of supply pipe or tubing is installed from a shower/tub tap up to and through a wall at shower height and/or down and through the wall at the tub spout location. The supply tubing terminates in a length of ½ inch nominal (⅝" O.D.) tubing or stub out protruding out of the wall (the protruding portion is hereafter referred to as the stub out). The supply pipe or tubing leading to the stub out can be a single continuous length or multiple pieces including straight runs, preformed tubing stub out elbows, sweated elbows, etc., as long as it terminates in a ½" nominal (⅝" O.D.) stub out protruding outward from the wall. The tubing including the stub out can be copper, brass or stainless steel tube or one of a variety of, plastic tubing including, e.g. CPVC (Chlorinated Poly Vinyl Chloride), PEX (cross-linked Polyethylene) or PEX-AL:-PEX (cross-linked Polyethylene sandwiched around aluminum) or a combination of materials. The stub out is preferably strapped into position at shower height or the tub spout location via a simple two hole strap or the like. The wall surface is installed and finished around the protruding tubing stub out and, after which, pressure tests are then run on the plumbing system. The stub out may terminate in a spun closed "bullet", as is illustrated herein, or it can be open tubing which is terminated by any type of closure, or it can even be left open if no pressure test is required. A specialized adapter is then slid onto the protruding stub out until the adapter abuts the wall. The adapter is preferably made of molded plastic, which can include an integral metal one-way gripper ring which is configured to allow the adapter to be slid over the stub out but not retracted off of it. The adapter can also include an O-ring held in position by the gripper ring which provides a tight seal against the stub out. Both the gripper ring and the O-ring are held in position within the adapter via a retaining flange which is heat and pressure treated to conform it to a retaining position. The adapter has a ½" I.P.S. ("Iron Pipe Size") front opening with female threads forming a threaded receiver sized to accommodate a standard ½ inch I.P.S. shower arm or a special nipple having male threads at each end. The adapter further includes an integral ferrule within the threaded receiver which compression seals a shower arm or nipple as it is threaded into the adapter. Once the adapter is pushed into position against the wall, it holds the stub out securely into position and prevents the stub out from being pushed backward into the wall. The in-wall bracketing prevents any forward movement of the stub out. Another method of preventing forward movement of the stub out is to utilize existing stub out fittings with built-in, integral support flange which is precisely located for use with tub spout stub outs to be flush with the inside of the finished wall. This flange member then abuts the inside of the finished wall and is utilized in combination with the inventive adapter to "sandwich" the finished wall using the one-way gripper ring on the inventive adapter to lock the inventive adapter in place preventing backward and forward movement of the stub out. Any excess length of the stub out extending beyond the adapter into the shower room can then be cut off just past the end of the adapter.

Due to the thin wall construction of a standard ½" I.P.S. brass shower arm, the stub out can be received within such a shower arm. Similarly, in the tub spout application, the nipple has an internal dimension large enough to receive the ½" nominal tubing. The nipple generally must be specially made because the internal dimension of standard nipples is not large enough to receive ½" nominal tubing. The shower arm or nipple is thus placed over the remainder of the stub out and threaded into the adapter, placing it in a sealing position between the threaded receiver and the integral ferrule. The adapter can be rotated about the stub out to allow the shower arm or a tub spout connected to the nipple to be positioned at the desired orientation. The adapter includes a housing with a base flange which includes radially extending fingers which are flexible and discontinuous, allowing weep holes for moisture to escape and also allowing an escutcheon plate to be slid onto the shower arm and snapped onto the base flange fingers to cover the adapter and hole. The base flange also securely retains the escutcheon plate in place, preventing it from rattling loose and away from the finished wall. A shower head can then be installed onto the shower arm to complete the installation of the shower head. In the tub spout application, a tub spout can be secured to the nipple, without an escutcheon plate, because the rear opening of the tub spout is wider than and completely encloses the adapter.

OBJECTS AND ADVANTAGES OF THE INVENTION

The principal objects of the present invention include: providing an improved installation system and method for shower heads and tub spouts; providing such a system and method which leaves all threaded connections exposed outside of a finished wall; providing such a system and method which minimizes hidden leaks and saves installation time and materials; providing such a system and method which makes repairs significantly easier; providing such a system and method which allows a shower arm or tub spout to be easily installed at the correct orientation without the need to apply excessive amounts of force on the system; providing such a system and method which allows ready access to all threaded connection points outside of a finished wall surface; and providing such a system and method which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 6 is an enlarged, fragmentary cross-sectional view of the inventive shower head installation system and method according to the present invention, taken along line 6—6 of FIG. 2 and showing an inventive adapter of the installation system.

FIG. 7 is an exploded perspective view of the inventive adapter including an O-ring and a gripper ring.

FIG. 8 is a fragmentary cross sectional view of a partially assembled adapter taken generally along line 8—8 in FIG.

7, shown with the O-ring and gripper ring in position but prior to pressing a retaining flange into engagement with the gripper ring.

FIG. 9 is a cross sectional view of the adapter taken generally along line 9—9 in FIG. 7, shown fully assembled with the retaining flange heat treated and pressed into retaining position.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Prior Art

Figures 1, 2:
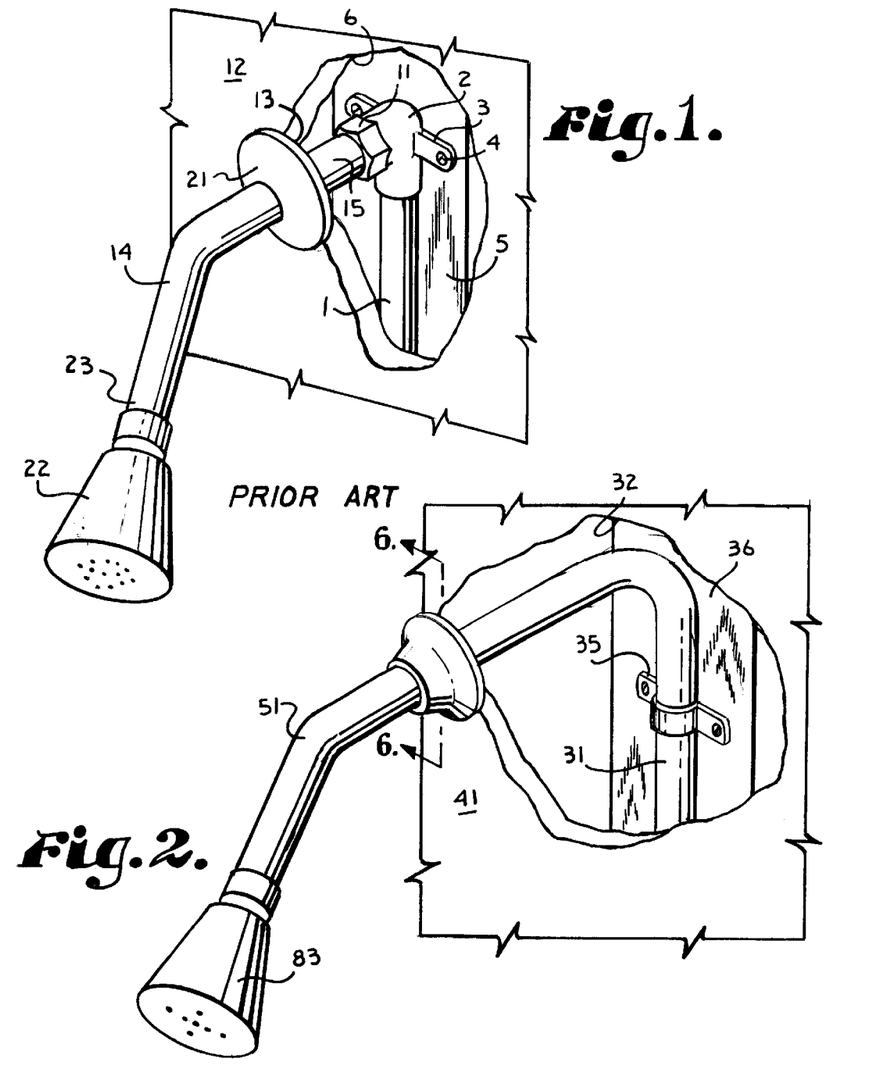
FIG. 1 is a perspective view of a prior art shower head installation system and method.
FIG. 2 is a perspective view of the inventive shower head installation system and method.

Referring to FIG. 1, a prior art shower head installation system and method is illustrated. The prior art system includes a vertical pipe or tube 1 which extends upward from a shower tap (not shown) to shower height where it is sweat fitted (or otherwise attached) into a downward facing opening of a brass drop ear 90 degree elbow 2. The elbow 2 includes a pair of ears 3, each of which has an aperture for acceptance of a screw 4 or other fastener which secures the elbow securely to a plate 5 positioned within a stud wall 6. A length of threaded test pipe (not shown) is first threadably inserted into a female threaded receiver 11 of the elbow 2, and a wall surface material, such as wallboard 12, is attached to the stud wall 6, leaving a through hole 13 (not shown) extending through the wallboard 12 about the test pipe. The plumbing system is pressure tested after a final wall finish is applied. Once the pressure test is complete, the test pipe is removed and a shower arm 14 is installed by blindly inserting a threaded end 15 of the arm 14 through the hole 13 and turning the arm until it is tightly threading into the elbow 2. An escutcheon plate 21 is then slid over the shower arm 14 to cover the hole 13 and a shower head 22 can then be installed onto an opposite threaded end 23 of the shower arm 14.

As described previously, the prior art installation system and method illustrated in FIG. 1 results in a blind threaded connection between the shower arm 14 and the elbow 2 which is positioned entirely behind the finished wall material 12.

II. Inventive Shower Head Installation System and Method

Referring to FIGS. 2–9, in the present invention, a length of pipe or tubing 31 is installed from a shower tap (not shown) up to and through a wall 32 at shower height with the pipe 31 protruding out of the wall 32 via a hole 33 and terminating in a ½" nominal (⅝" O.D.) stub out, herein illustrated as a spun closed "bullet" stub out 34. The pipe 31 can be a single length of copper pipe, as shown, or multiple pieces of copper or plastic including straight runs, preformed tubing stub out elbows, threaded connections, sweated elbows, etc., as long as it terminates in a ⅝" O.D. stub out protruding outward from the wall 32 at shower height. The stub out 34 is preferably secured into position at shower height via a simple two hole strap 35 or the like, which can be attached to a supporting plate 36. A surface wall material, such as wallboard 41, is then installed and finished around the protruding stub out 34, and, after the shower structure is finished by installation of paint, tile, shower surround, etc., pressure tests are run on the plumbing system, which tests are made convenient by the spun closed stub out 34. A specialized spout adapter 42 is then slid onto the protruding stub out 34 until the adapter 42 abuts the wallboard 41. As will be described in more detail below, the adapter securely grips the stub out 34 and prevents the stub out from being pushed back through hole 33 in wall 32, while the strap 35 prevents the stub out 34 from being pulled forward through the hole 33.

The adapter 42, as is best illustrated in FIGS. 6–9, includes a housing 43, preferably made of molded plastic, such as a glass filled polypropylene, for example. The housing 43 includes a hex portion 44 which is internally threaded with threads 45 in a through bore 46, resulting in a threaded receiver which is sized to accommodate external threads 50 (FIG. 6) of a standard angled shower arm 51. The hex portion 44 can accommodate a standard sized wrench (not shown) for turning the adapter 42 about the stub out 34. The housing 43 also includes a disc portion or base flange 52 which terminates in a plurality of gripper fingers 53 which extend radially outward from the base flange 52. The fingers 53 are integrally formed with the housing 43, leaving respective gaps 54 such that the fingers 53 are allowed to flex inward toward the housing 43. The gaps 54 also act as weep openings to allow moisture to escape from a finished installation.

Figures 6, 7, 8, 9:
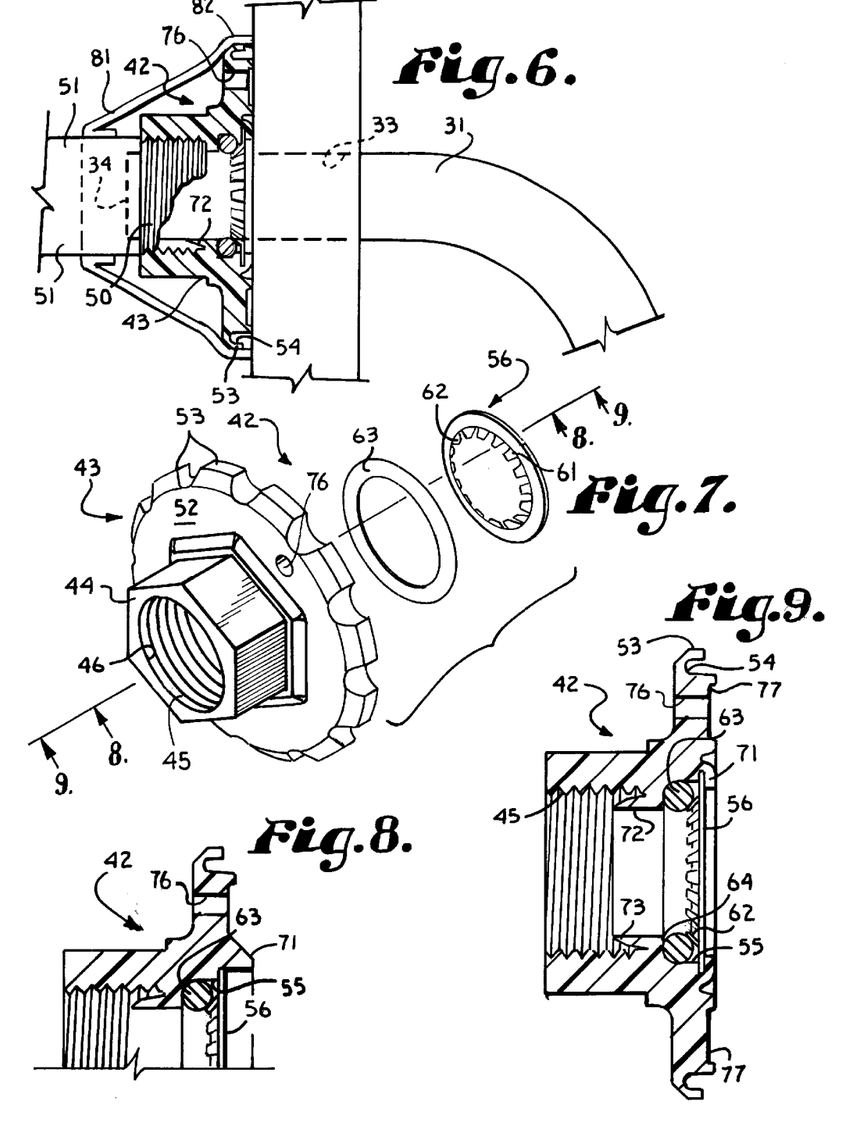

The base flange 52 has a centered opening 55 extending therethrough which connects with the threaded opening 46 of the hex portion 44. The adapter preferably includes a metal gripper ring 56 which generally comprises a circular ring portion 61 from which a plurality of gripping teeth 62 extend radially inward. Each gripper tooth 62 is angled forward when th adaper 42 is fully assembled, as illustrated in FIG. 9. An optional sealing O-ring 63 is positioned within the adapter 42 between the gripper ring 56 and a circular ledge or shoulder 64 within the adapter housing 43. The O-ring 63 provides a positive water proof seal around the stub out 34 when the adapter 42 is installed thereon to prevent water from leaking along the stub out 34 within the adapter 42 if the adapter 42 were improperly installed. The O-ring 63 and the gripper ring 56 are held in place within the housing 43 by a retaining flange 71 which is integrally molded with the housing 42 and which retaining 71 is concentric with and extends outward around the centered opening 55, as shown in FIG. 8. Once the O-ring 63 and the gripper ring 56 are positioned in the housing 42, the retaining flange 71 is heat and pressure treated to change if from the open, molded configuration of FIG. 8 and permanently alter it to the retaining position shown in FIG. 9 where it securely holds the gripper ring 56 and O-ring 63 in position against the ledge 64.

An integral ferrule 72 is preferably molded into the housing 42 with the ferrule 72 forming a tapered ring 73 which is concentric with and positioned in inward spaced relation from the internal threads 45 from an inner end thereof. An inner diameter of the ferrule 72 is slightly greater than the outer diameter of the stub out 34 to permit the stub out 34 to pass through the ferrule 72 when the adapter 42 is slid over the stub out 34 and before the ferrule is compressed. As shown in FIG. 6, as the shower arm 51 is threaded into the adapter housing 43, the shower arm threads 50 are forced between the ferrule tapered ring 73 and the female threads 45 of the adapter 42 , compressing the tapered ring 73 of the ferrule 72 against the outer surface of the stub out 34. The ferrule 72 thus forms a secure, water-proof seal between the shower arm 51 and the stub out 34 as the shower arm 51 is threaded into the adapter housing 43.

Figures 3, 4:
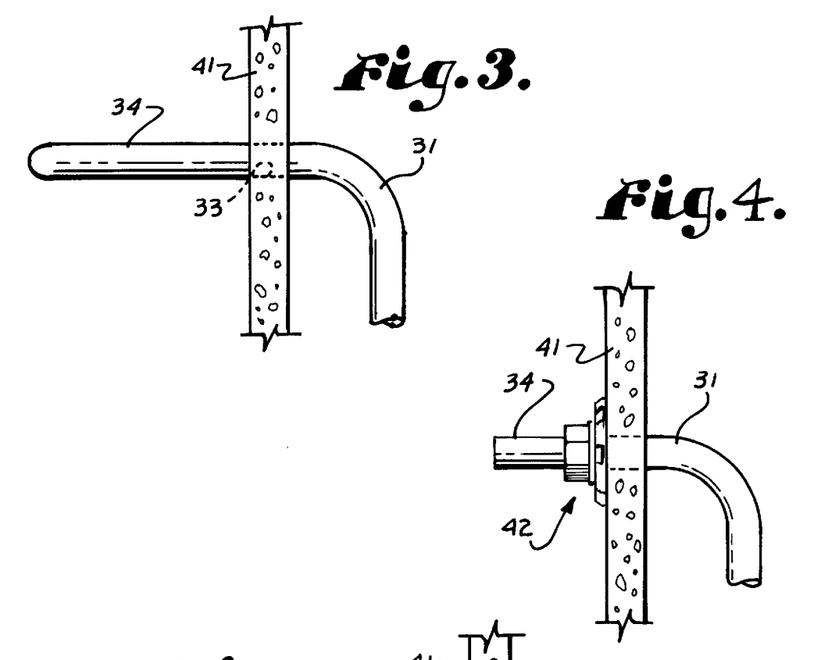
FIGS. 3, 4 and 5 are illustrations of sequential steps involved in the inventive shower head installation method.
Figure 5:
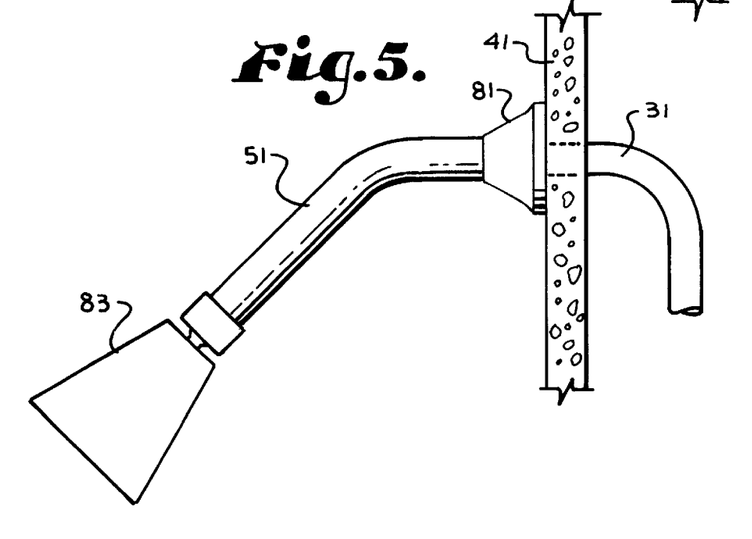

Referring again to FIGS. 2–6, after the adapter 42 is pushed onto the protruding stub out 34, the stub out 34 is cut off just outside the housing 43, as shown in FIG. 6. If desired, the stub out 34 can be cut off as much as 2 inches or so beyond the adapter 42, as is generally shown in FIG. 4. The shower arm 51 is then placed over the cut off stub out 34 and threaded into the adapter 42, again as shown in FIG. 6. The adapter 42 can be rotated about the stub out 34, either by hand or by using a wrench on the hex portion 44, to correctly orient the internal threads 45 to allow the shower arm 51 to assume a proper orientation when fully threaded into the adapter 42. The compression fitting of the ferrule 72 normally acts to prevent the adapter 42 from being moved relative to the stub out 34. In addition, if the adapter 42 incorporates the gripper ring 56 (which can be optional), then the adapter 42 is positively prevented from being pulled off of the stub out 34, even in the absence of an installed shower arm 51, by engagement of the gripping teeth 62 against the outer surface of stub out 34.

A hole 76 may be formed in and extend through the base flange 52 in communication with a circumferential trough 77 formed in a rear surface of the base flange 52 and extending around the centered opening 55. A screw (not shown) may be inserted through the hole 76 and threaded into the wall 32 to prevent rotation of the adapter 42 once the shower arm 51 is secured thereto in the desired orientation. Alternatively, an adhesive may be injected through the hole 76 and into the trough 77 between the rear surface of the base flange 52 and the wall 32 to adhere the adapter 42 to the wall and prevent further rotation of the adapter 42. It is foreseen that additional holes may be formed in the base flange 52 to facilitate securing the adapter 42 to a wall with multiple screws or nails however additional holes may make it more difficult to uniformly inject adhesives throughout the trough 77.

Once the shower arm 51 is secured to the adapter 42 and the desired orientation achieved, an escutcheon plate 81 is then placed around the shower arm 51 and slid upward until a perimeter lip 82 of the escutcheon plate 81 engages the radially extending fingers 53, flexing them inward toward the housing 43. The spring action of the flexed fingers 53 thus securely grips the escutcheon plate 81 in position covering the adapter 42 and the through wall hole 33. A shower head 83 can then be installed onto the shower arm 51 to complete the shower with no threaded connections positioned behind the wallboard 41.

Figure 10:
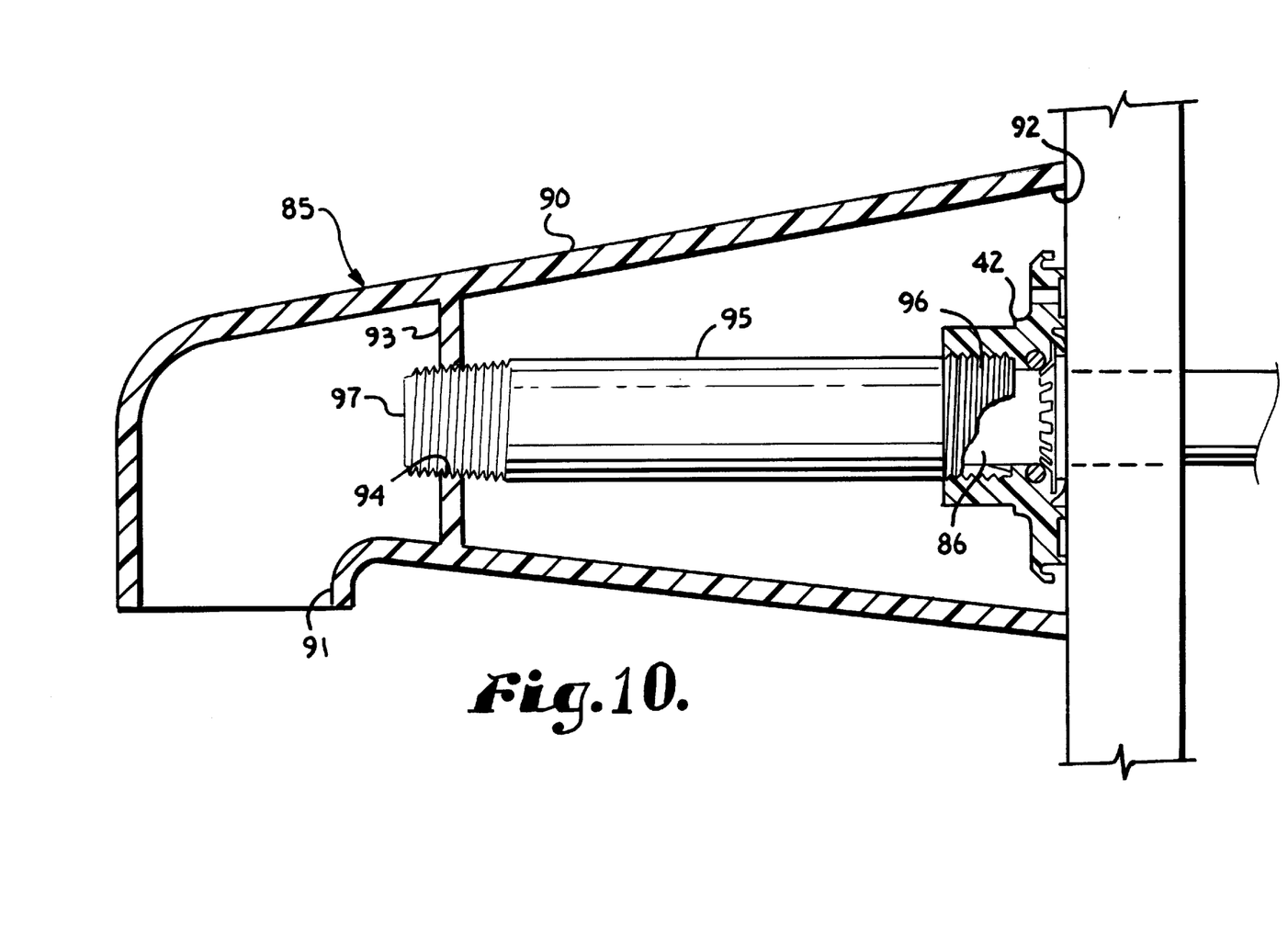
FIG. 10 is a cross sectional view of a tub spout secured to a stub out using the inventive adapter.

FIG. 10 shows the adapter 42 used for securing a standard tub spout 85 to a stub out 86 for a bath tub installation. The method of forming the stub out 86 for the tub spout 85 and for attaching the adapter 42 to the stub out 86 is essentially the same as discussed above for the shower spout application. The adapter 42 is particularly well adapted for use with tub spouts of the type adapted to be threaded onto a distal end of a threaded nipple which is threaded at its opposite end into a water supply line. The tub spout 85 includes a housing or outer continuous wall 90 with an outlet opening 91 formed at a front end thereof and an inlet opening 92 at a rear end thereof. A dividing wall 93 extends vertically across the interior of the housing 90 proximate the outlet opening 91. A threaded bore 94 extends through the dividing wall 93.

A nipple or male x male N.P.T. pipe nipple 95 is used to connect the tub spout 85 to the adapter 42 which is in turn connected to the stub out 86. The nipple 95 is threaded at both ends and the nipple is preferably of a thin wall construction of equivalent thickness as a standard shower arm such as shower arm 51. A first threaded end 96 of the nipple 95 is inserted over the outer end of the stub out 86 and threaded into the threads 45 in the hex portion 44 of the adapter 42 and over the tapered ring 73 of ferrule 72 compressing the ferrule 72 against the stab out 86 to form a leakproof seal therebetween. The tub spout 85 is then positioned over the nipple 95 such that a second threaded end 97 of the nipple 95 extends through the inlet opening 92 in the rear end of the tub spout housing 90. The tub spout 85 is then threaded onto the nipple 95 such that the second threaded end 97 of the nipple 95 is threaded into the threaded bore 94 in the dividing wall 93 of the tub spout 85. The nipple is sized, lengthwise such that the rear end of the tub spout 85 generally extends flush with the wall through which the stub out 86 extends when the spout 85 is secured to the nipple 95 in the desired orientation.

For purposes of this application, both the shower head and the tub spout may generally be referred to as spouts. In addition, the shower arm 51 and the nipple 95 may generally be referred to as a spout supply tube or a spout supply line, and the terms spout supply tube or spout supply line are intended to include any length of tubing or pipe adapted to flow connect a stub out or the like to an outlet opening for a spout.

It is foreseen that the adapter 42 could be adapted for use in other plumbing coupling applications and the invention is not to be considered limited to the environment shown. As earlier mentioned, although a spun closed bullet copper tubing stub out 34 has been illustrated and described, the invention is not so limited, and can be used in conjunction with any type of stub out which protrudes a sufficient distance outside a wall. In addition the dimensions provided are simply for use in describing a preferred embodiment adapted for use with conventional plumbing fittings of generally standardized dimensions. However, the dimensions provided above should not be deemed limiting and it is foreseen that the dimensions of the adapter could be changed to accommodate various applications. It is thus to be understood that while certain forms of the present invention have been illustrated and described herein, it is not to be limited to the specific forms or arrangement of parts described and shown.

We claim:

1. A spout installation system, comprising:
   a. a stub out which extends outward from a wall; and
   b. an adapter which includes:
      i. a housing with a central opening sized to accommodate the stub out;
      ii. a female threaded receiver in said housing which is sized to accept a male threaded end of a spout supply tube such that the spout supply tube, when threaded into said female receiver, is placed in communication with said stub out, said female threaded receiver including a threaded receiver wall; and
      iii. a ferrule which is integral with said housing and extends into said female threaded receiver in alignment with said central opening, at least a portion of an outer surface of said ferrule being positioned in concentric spaced relation to said threaded receiver wall so as to be engaged by the male threaded end of the spout supply tube when the male threaded end of the spout supply tube is threaded into said female receiver, the engagement between the male threaded end of the spout supply tube and said outer surface of said ferrule causing said ferrule to be compressed against said stub out.

2. A spout installation system as in claim 1, said adapter further comprising:

a. a gripper ring attached to said housing in a position surrounding said central opening, said gripper ring including a plurality of teeth which extend inward from said gripper ring and which are angled toward said threaded receiver.

3. A spout installation system as in claim 2 further comprising:

a. an O-ring seal positioned within said housing in a position such that it surrounds and engages said stub out when said adapter is positioned on said stub out.

4. A spout installation system as in claim 3 further comprising a retaining flange which is concentric with said central opening on a rear surface of said housing, said retaining flange being deformable to retain said gripper ring and said O-ring in position.

5. A spout installation system, comprising:

a. a stub out which extends outward from a wall; and
b. an adapter which includes:
   i. a housing with a central opening sized to accommodate the stub out;
   ii. a female threaded receiver in said housing which is sized to accept a male threaded end of a spout supply tube such that the spout supply tube, when threaded into said female receiver, is placed in communication with said stub out;
   iii. a ferrule which is concentric with said female threaded receiver and positioned to be engaged by said male threaded end of said spout supply tube and compressed against said stub out when said male threaded end of said spout supply tube is threaded into said female receiver;
   iv. a gripper ring attached to said housing in a position surrounding said central opening, said gripper ring including a plurality of teeth which extend inward from said gripper ring and which are angled toward said threaded receiver;
   v. an O-ring seal positioned within said housing in a position such that it surrounds and engages said stub out when said adapter is positioned on said stub out; and
   vi. a retaining flange which is concentric with said central opening on a rear surface of said housing, said retaining flange being integrally molded with said housing and deformable to retain said gripper ring and said O-ring in position.

6. A spout installation system, comprising:

a. a stub out which extends outward from a wall; and
b. an adapter which includes:
   i. a housing with a central opening sized to accommodate the stub out;
   ii. a female threaded receiver in said housing which is sized to accept a male threaded end of a spout supply tube such that the spout supply tube, when threaded into said female receiver, is placed in communication with said stub out;
   iii. a ferrule which is concentric with said female threaded receiver and positioned to be engaged by said male threaded end of said spout supply tube and compressed against said stub out when said male threaded end of said spout supply tube is threaded into said female receiver; and
   iv. a base flange including a plurality of escutcheon plate gripper fingers extending radially outwardly therefrom, said gripper fingers being separated by respective gaps.

7. A plumbing adapter comprising:

a. a housing with a central opening sized to accommodate a plumbing stub out;
b. a gripper ring attached to said housing in a position surrounding said central opening, said gripper ring including a plurality of teeth which are angled to grip a plumbing stub out received in said central opening to prevent removal of the adapter from the plumbing stub out;
c. a seal positioned within said housing in a position such that it surrounds a stub out gripped by said gripper ring;
d. a female threaded receiver surrounding said central opening, said receiver being sized to accept male threads from a plumbing fixture; and
e. a base flange including a plurality of escutcheon plate gripper fingers extending radially outward therefrom, said gripper fingers being separated by respective gaps.

8. A plumbing adapter as in claim 7, and further comprising:

a. a ferrule which is concentric with said female threaded receiver.

9. A plumbing adapter as in claim 8, wherein said ferrule is integrally molded with said housing.

10. A plumbing adapter as in claim 7, wherein said seal comprises an O-ring which is positioned adjacent said gripper ring.

11. A plumbing adapter as in claim 10, and further comprising a retaining flange which is concentric with said central opening on a rear surface of said housing, said retaining flange being deformable to retain said gripper ring and said O-ring in position.

12. A plumbing adapter as in claim 11, wherein said retaining flange is integrally molded with said housing.

13. A plumbing adapter for connecting a first tube to a second tube wherein the outer diameter of the first tube is smaller than the inner diameter of the second tube, said plumbing adapter comprising:

a. a housing with a central opening extending therethrough sized to accommodate a plumbing stub out;
b. said housing having a female threaded receiver surrounding said central opening at one end thereof and sized to receive a male threaded end of the second tube;
c. a ferrule fixedly secured to said housing and having a tapered ring portion extending inward in spaced relation from an inner end of said female threaded receiver; said ferrule having an inner diameter slightly greater than the outer diameter of the first tube when said ferrule is in an uncompressed state such that said adapter may be positioned on said first tube such that said first tube extends through said ferrule; said tapered ring portion of said ferrule sized to be compressed inward against the first tube upon threading of a male threaded end of said second tube into said threaded receiver between said tapered ring portion of said ferrule and said threaded receiver.

14. The plumbing adapter as in claim 13 wherein said ferrule is integrally formed on said housing.

15. The plumbing adapter as in claim 13 further comprising:

a. a gripper ring attached to said housing in a position surrounding said central opening, said gripper ring including a plurality of teeth which are angled to grip the first tube received in said central opening to prevent removal of the adapter from the first tube.

16. The plumbing adapter as in claim 13 further comprising:

a. a seal positioned within said housing in a position such that it surrounds the first tube received in said central opening.

17. The plumbing adapter as in claim 16 wherein:
 a. said seal is positioned between said ferrule and said gripper ring.

18. A method of installing a spout into a plumbing system, comprising the steps of:
 a. connecting a stub out to a water supply and extending the stub out through a wall;
 b. providing an adapter including:
  i. a housing with a central opening sized to accommodate the stub out;
  ii. a gripper ring attached to said housing in a position surrounding said central opening, said gripper ring including a plurality of teeth which are angled to grip the stub out to prevent removal of the adapter from the stub out;
  iii. a seal positioned within said housing in a position such that it surrounds said stub out;
  iv. a female threaded receiver in said housing which is sized to accept male threads from a spout supply tube such that the spout supply tube, when threaded into said female receiver, is placed in communication with said stub out; and
  v. a base flange extending outwardly from said housing;
 c. sliding said central opening of said adapter onto said stub out and pushing said adapter along the stub out until said base flange engages said wall;
 d. placing a spout supply tube over the stub out and threading it into the threaded receiver of said adapter; and
 e. installing a spout onto said spout supply tube.

19. A method of installing a spout into a plumbing system, comprising the steps of:
 a. connecting a stub out to a water supply and extending the stub out through a wall;
 b. installing a spout supply tube over the stub out, with an adapter including:
  i. a housing with a central opening sized to accommodate the stub out;
  ii. a gripper ring attached to said housing in a position surrounding said central opening, said gripper ring including a plurality of teeth which are angled to grip the stub out to prevent removal of the adapter from the stub out;
  iii. a seal positioned within said housing in a position such that it surrounds said stub out;
  iv. a female threaded receiver in said housing which is sized to accept male threads from a spout supply tube such that the spout supply tube, when threaded into said female receiver, is placed in communication with said stub out; and
  v. a base flange including a plurality of escutcheon plate gripper fingers extending radially outwardly therefrom;
 c. placing a spout supply tube over the stub out and threading it into the threaded receiver of said adapter;
 d. placing an escutcheon plate over said spout supply tube and snapping it into position over said gripping fingers of said adapter; and
 e. installing a spout onto said spout supply tube.

20. A method as in claim 18, said adapter further comprising a ferrule which is concentric with a portion of said female threads, said spout supply tube threading step including threading said spout supply tube into said threaded receiver until a terminal portion of said spout supply tube is placed between said ferrule and said threaded receiver.

21. A method as in claim 18, and further comprising the step of rotating said adapter around said stub out until said spout supply tube is correctly oriented.

22. A method as in claim 18, said adapter housing base flange including a hole for accepting a fastener, said method further comprising the step of placing a fastener through said hole and into said wall to prevent rotation of said adapter.

23. A method as in claim 18, said adapter housing base flange including an annular groove in a rear surface thereof and a hole extending through said base flange communicating with said annular groove, said method further comprising the step of injecting adhesive through said hole into said annular groove, the adhesive bonding said adapter to the wall.

24. A method as in claim 18, said adapter housing base flange including a plurality of escutcheon plate gripper fingers extending outwardly therefrom said method further comprising the step of placing an escutcheon plate over said spout supply tube and snapping it into position over said gripping fingers.

25. A plumbing adapter for connecting a spout to a plumbing stub out extending outwardly from a wall, the adapter comprising:
 a. a housing with a central opening sized to accommodate a stub out;
 b. a gripper ring attached to said housing in a position surrounding said central opening, said gripper ring including a plurality of teeth which are angled to grip a stub out received in said central opening to prevent removal of the adapter from the stub out;
 c. a seal positioned within said housing in a position such that it surrounds a stub out gripped by said gripper ring;
 d. a female threaded receiver surrounding said central opening, said receiver being sized to accept male threads from a plumbing fixture; and
 e. a base flange extending outwardly from said housing around said central opening and positioned to engage a wall around a stub out received in said central opening.

* * * * *